United States Patent [19]

Stewart

[11] Patent Number: 4,485,761
[45] Date of Patent: Dec. 4, 1984

[54] APPARATUS FOR TREATING WORK PIECES

[75] Inventor: Donald G. Stewart, High Wycombe, England

[73] Assignee: Brent Chemicals International, Iver, England

[21] Appl. No.: 352,430

[22] Filed: Feb. 25, 1982

[30] Foreign Application Priority Data

Feb. 28, 1981 [GB] United Kingdom ................. 8106388

[51] Int. Cl.³ .......................... B05C 3/10; B05C 11/00
[52] U.S. Cl. ..................................... 118/702; 118/704; 118/426; 134/58 R; 134/77; 198/342
[58] Field of Search .................. 118/426, 704, 702; 134/80, 81, 77, 79, 58 R; 198/342

[56] References Cited

U.S. PATENT DOCUMENTS

| | | | |
|---|---|---|---|
| 2,417,472 | 3/1947 | Dorff | 118/426 X |
| 2,605,882 | 8/1952 | Curtis | 198/342 |
| 2,615,421 | 10/1952 | Davis et al. | 118/702 |
| 2,916,131 | 12/1959 | Holden | 118/704 X |
| 3,382,844 | 5/1968 | Kumpf | 134/80 X |
| 3,807,353 | 4/1974 | Kobernick | 118/702 |

FOREIGN PATENT DOCUMENTS 2033865A  5/1980  United Kingdom ................ 118/426

*Primary Examiner*—Evan K. Lawrence
*Attorney, Agent, or Firm*—Lawrence Rosen

[57] ABSTRACT

Apparatus for treating a plurality of work pieces at spaced apart treatment stations 19 arranged around a circle comprises a conveyor 8 that is a horizontal ring and that is mounted on supports 5 connected to an outer housing for rotation about its vertical axis by a drive 10, and hangers 12 mounted on the ring 8 and including reciprocating means 15 by which a work piece 13 may be lowered into or raised from a treatment station 19. The apparatus is useful for conducting inspection penetrant treatment processes and other processes.

9 Claims, 4 Drawing Figures

APPARATUS FOR TREATING WORK PIECES

Various systems are known for subjecting work pieces automatically to treatment at a plurality of treatment stations and for moving the work pieces from one station to the next.

In one type of system the work pieces are suspended from the arms of a spinder that extends out from a central supporting assembly. When the work pieces are to be moved from one treatment station to another the entire assembly is rotated stepwise. It is necessary to be able to lower the work pieces into, or raise them from, the treatment stations and this is generally achieved by raising or lowering the arms. If the arms are raised or lowered by pivoting around a horizontal pivot on or in the centre assembly the radius of the arms has to be very large in order that the movement of the work pieces is substantially vertical. If the work pieces are to move in a truly vertical fashion then some reciprocating mechanism or mechanisms has to be provided and in practice this is provided in or on the central assembly. Typical such devices are disclosed in U.S. Pat. Nos. 2,916,131 d 1,870,743 and British Patent Specification Nos. 2,033,865 and 872,347.

A difficulty with all devices of this type is that the main load is carried by the arms and the central supporting assembly and so this assembly and the arms both have to be strong and have to be engineered to permit the required types of rotation. Additionally suitable reciprocating mechanism may have to be provided in the assembly. All this is inconvenient but, in particular, there is a problem in that it is necessary to ensure that the central assembly is not contacted by toxic or corrosive fumes, both in order to minimise corrosion problems and to permit the necessary frequent maintenance of it.

In another type of system the work pieces are suspended by hangers from a conveyor that is above the treatment stations. The conveyor may be circular, for instance a closed loop monorail, or it can be linear. The conveyor and the hangers are constructed so that the work pieces can be lowered into or raised out of the treatment station as they move along the conveyor.

In one construction the conveyor may follow a path that dips down towards each treatment station and rises up from it, so that movement of the work piece along the path causes it to dip down into and be raised up out of each station as the conveyor moves with respect to each station. Apparatus designed to work in this method necessarily is very bulky.

In another construction the conveyor is substantially horizontal and moves beneath reciprocating means which are fixed above treatment stations. Thus the conveyor carries a work piece stepwise to a position between a reciprocating means and a treatment station, the reciprocating means causes the work piece to be lowered into the treatment station and subsequently to be raised from it, and then the conveyor carries that work piece away from the reciprocating means and treatment station onto the next reciprocating means and treatment station. It can be difficult to engineer this system to work in a reliable manner, for instance because of the problems of ensuring accurate registration of the fixed reciprocating means and the work piece to be moved by it.

Apparatus according to the invention for treating a plurality of work pieces comprises a plurality of spaced apart treatment stations arranged around a circle, a conveyor and a plurality of spaced apart hangers each for holding a work piece, and a drive for moving the conveyor stepwise to move the hangers over the treatment stations and this apparatus is characterised in that the conveyor is a horizontal ring that is supported for rotation about its vertical axis by a plurality of supports connected to an outer housing and each of the hangers is mounted on the ring and includes reciprocating means by which a work piece may be lowered into or raised from a treatment station.

The ring conveyor is generally mounted above the treatment stations, and generally directly above them. The hangers and the reciprocating means are mounted on the conveyor and move with that conveyor stepwise around the treatment stations. Truly vertical movement of the work pieces into and out of each station is thus easily obtainable even though the apparatus can be very much smaller than known circular treatment apparatus. Since all the moving parts can be fitted on or above the conveyor, which can be close to the top of the apparatus, maintenance can be much more easily effected than with the spider type of system. Also since there need be no moving parts in the centre of the apparatus it is easily possible to provide an air extraction chimney in the centre of the apparatus and to provide draughts through the treatment stations into this chimney so that toxic or corrosive materials can be handled without creating problems of corrosion or maintenance.

The conveyor is a horizontal ring that moves around and is supported by the apparatus. The apparatus generally includes an outer housing, that may be or include a framework. Generally the conveyor is supported from the side walls of the housing. It must be supported for rotation about the vertical axis and so in practice there must be at least three support points and there may be more. These support points may, for instance, be on members extending radially inwards from the housing. In another construction they may be carried on members extending radially outwards from a central support. In another, they may be hung from the roof of the apparatus. At each of the points where the conveyor is supported the support is generally through a bearing that facilitates rotation of the conveyor with respect to the support.

The drive for moving the conveyor over the stations may be, for instance, an electric or pneumatic motor. Preferably the drive for moving the conveyor is a drive that moves the conveyor stepwise with each step of the conveyor generally being the distance between adjacent spaced apart treatment stations. Thus normally one step of the drive results in a hanger moving from one treatment station to the next. Preferably the drive is designed so as to give uniform acceleration and deceleration. For instance it may be a servo-controlled drive.

Each hanger generally comprises a frame or rod suspended from the conveyor and provided with means at its lower end for securing the work pieces to the hanger. These means may comprise, for instance, a basket in which they are placed or a hook, bolt or other means for attaching the work piece to the end of the hanger.

Each hanger is generally permanently fixed, during use, to its associated reciprocating means, which is also mounted on the conveyor. The reciprocating means may comprise a piston and cylinder operated by air or other pneumatic or hydraulic fluid in which event the hanger may be, for instance, the piston rod. Alternatively the reciprocating means may each comprise an electric motor mounted on the conveyor and means for raising or lowering the hanger by the motor.

Preferably there are means for rotating the work pieces suspended on the hangers. Thus there may be means either for rotating the entire hanger or for rotating the end of the hanger, generally the means by which the work pieces are secured to the hanger. Thus there may be a bearing at the lower end of each hanger. Rotation may be caused by, for instance, a mechanical drive, for instance operated by an electric or pneumatic motor, or it may be achieved by directing air or other fluid jets tangentially onto the work pieces.

Preferably there is a single power supply for actuating all the reciprocating means and each reciprocating means is activated by this supply only when the associated hanger is in the correct position for raising or lowering its work piece. When the reciprocating means are electrically driven this common power supply may be a bussbar. When the reciprocating means are hydraulically or pneumatically driven this common supply may be a ring main.

In a preferred feature of the invention there is a ring main that moves with the conveyor and with which all the reciprocating means are connected and the ring main is connected to its fluid or air supply only when the reciprocating means are located above treatment stations.

The apparatus will include a main timing mechanism for controlling the stepwise rotation of the conveyor drive but generally also it includes separate timing mechanisms for timing the operation of each individual reciprocating means. Thus at the end of each stepwise rotation these individual timing mechanisms may then control the movement of each individual hanger. Thus some hangers may move downwards immediately after a stepwise rotation whilst for others there may be a time lapse before they move downwards.

It will be appreciated that useful treatment may sometimes be effected even after a work piece has been removed from a treatment station. For instance a treatment may involve contact with a liquid and then holding the wet surface in air for a chosen duration. This can be easily achieved in the invention, for instance by arranging for the appropriate hanger to lower the work piece into an immersion tank or spray booth for a short period, and then to raise it out of that booth and hold it above the booth for a chosen duration, before moving onto the next station. When it reaches the next station this contact can be continued before the hanger is lowered and indeed in some instances it may be desirable to continue the contact for such a time that the hanger is not lowered at at least one of the treatment stations.

Each treatment station will be constructed for the particular purpose that is required. For instance when the treatment involves contact with a liquid the treatment station may, in use, comprise an immersion tank or a spray booth and may be provided with suitable drainage outlets for removing used liquid. There may be heat exchangers or other means for altering the temperature of the liquid. When the treatment involves drying a work piece the treatment station may include, in use, suitable heaters or means for blowing air over the work pieces, or both. Again a suitable drainage outlet may be provided.

The apparatus is of value in any multistage treatment where solid work pieces are to be subjected to a plurality of treatments. For instance it can be used in the application of materials or in their removal, or in any combination thereof. Thus it may be used for paint stripping, cleaning, application of paints or protective films or chemical plating. Preferably however it is used in inspection penetrant treatments. In such a process the work pieces may pass successively through a cleaning station, a station at which penetrant composition, preferably a fluorescent composition, is applied, one or more stages in which excess penetrant is removed and the surface is rinsed, a drying stage and often a developer stage.

The invention is now illustrated in the accompanying drawings which show an apparatus designed for the application of dye penetrant inspection compositions. In these drawings, FIG. 1 is a side elevation, with part broken away, of the entire apparatus;

Figure 1:
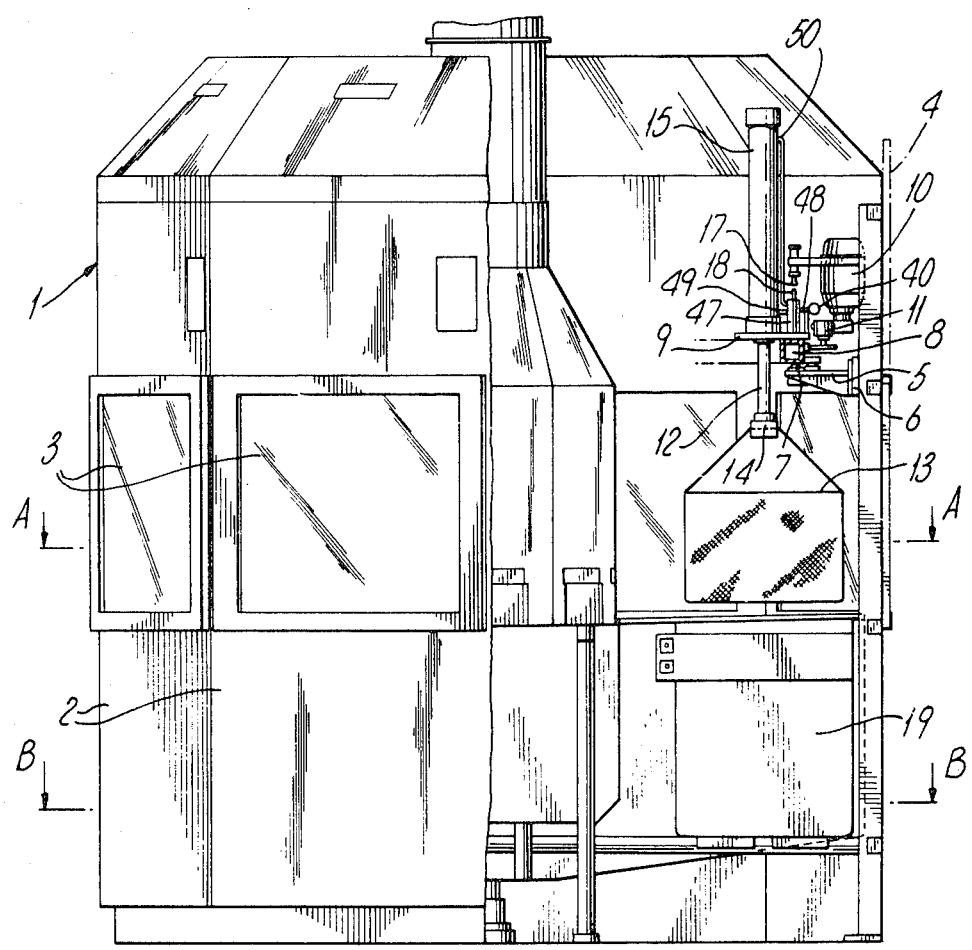
Figure 2:
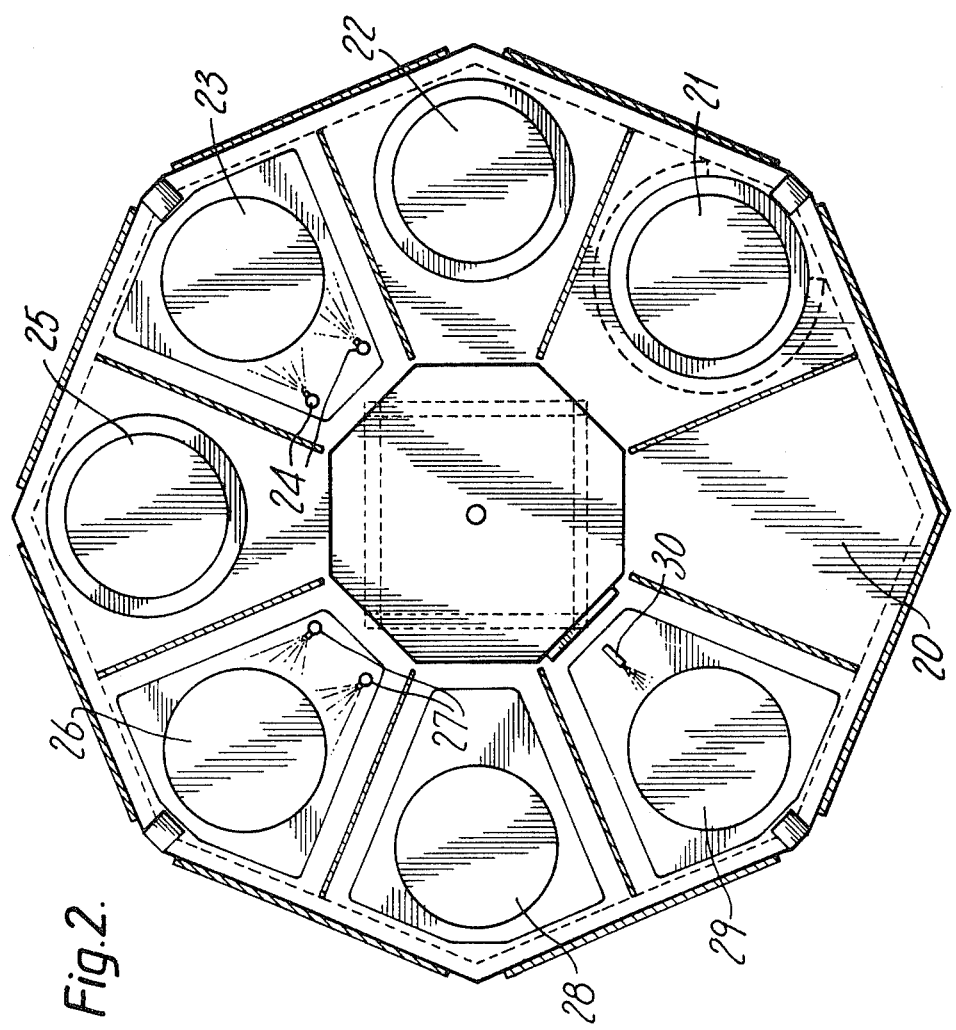
FIG. 2 is a section on the line A—A in FIG. 1.
Figure 3:
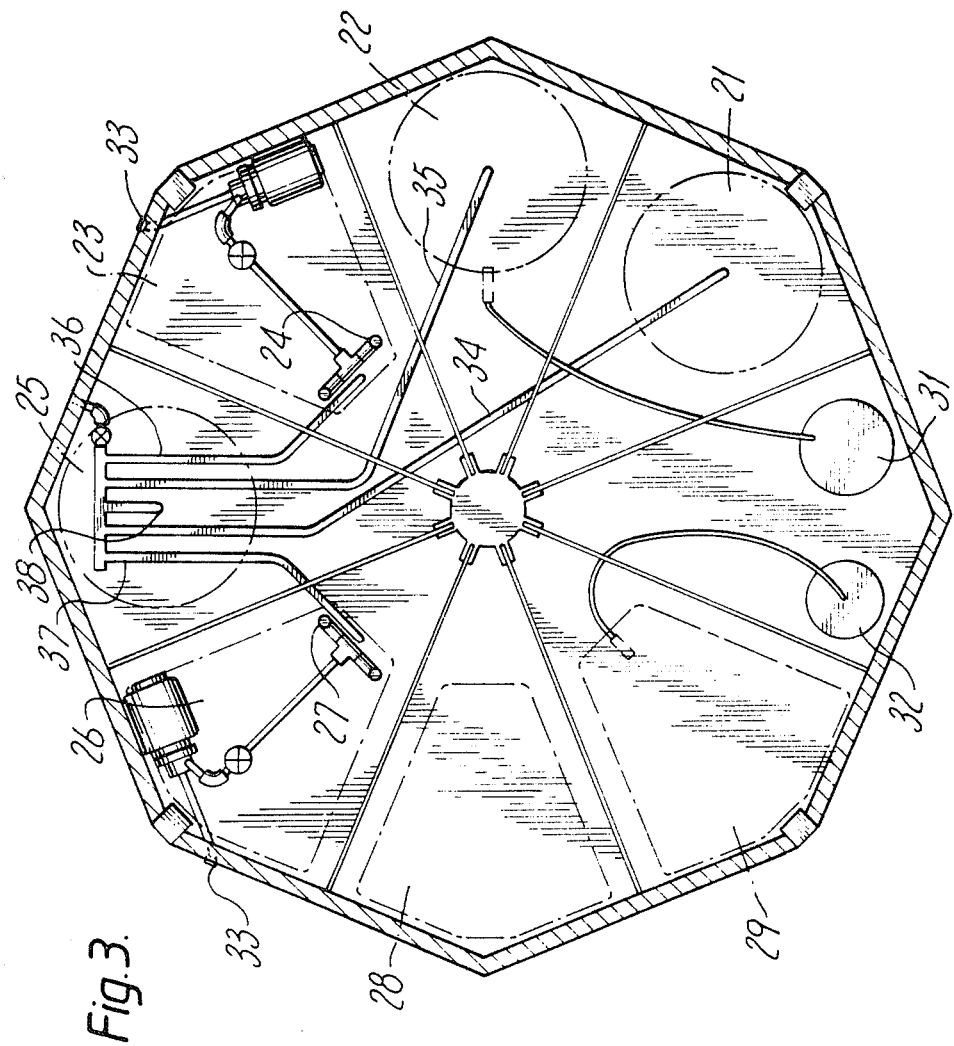
FIG. 3 is a section on the line B—B in FIG. 1.

The apparatus comprises an octagonal housing 1 having eight faces 2 each of which includes an inspection window 3 that can be slid vertically upwards to the position 4 so as to leave an aperture for access to the inside of the housing.

Three or more rigid support plates 5 extend radially inwards from a ring fixing plate 6 carried by the housing. On each support plate 5 there is a bearing 7, generally a ball on a recirculating race. A circular ring 8 that is of steel square section and is hollow is carried on these bearings and may thus rotate around the housing. This ring 8 serves as a conveyor. There are eight horizontal plates 9 secured to the ring.

There is a motor (which may be pneumatic or electric) 10 fixed to the housing and provided with appropriate gearing 11 for transmitting its drive to the ring 8. Thus the motor 10 causes the ring 8, and thus the plates 9, to rotate around the vertical axis of the housing. The ring 8 thus serves as a conveyor. Eight hangers are suspended from the conveyor. Each hanger comprises a vertical rod 12 terminating at its lower end in a rotatable bearing 14 from which a basket 13 is suspended. Each rod 12 extends from a piston mounted within a pneumatic cylinder 15.

Figure 4:
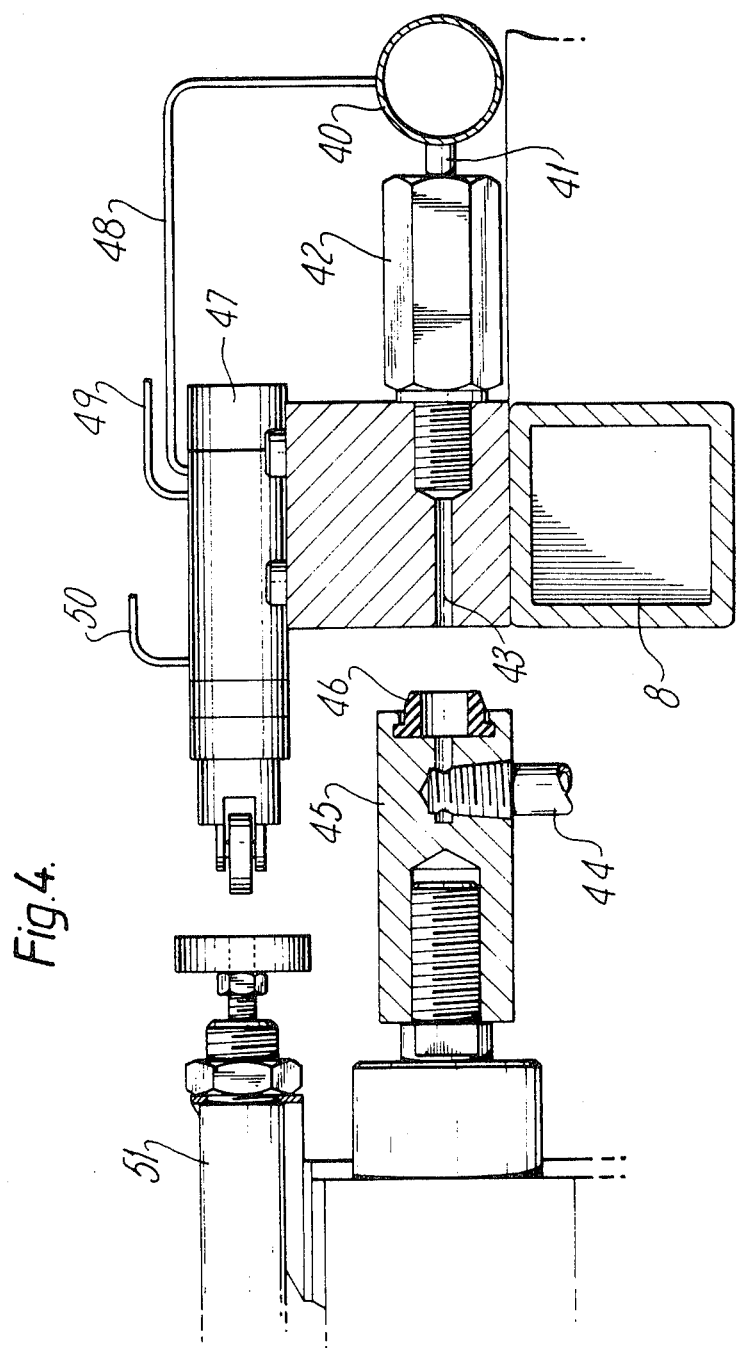
FIG. 4 is a detail of a modification of the apparatus shown in FIG. 1.

An air supply ring main 40 is supported on the plates 9 and thus extends around the apparatus. There are eight inlets 41 to this ring main, each inlet comprising a supply inlet 43 and a one way valve 42 that permits air to pass into the ring main from the supply inlet but prevents escape of air from the ring main to the supply inlet. These are illustrated in more detail in FIG. 4.

There is a single air supply 44 located in any convenient position around the ring which terminates in a plunger 45 having a resilient rubber connector 46.

When the nipples 17 and 18 come into engagement at the end of a stepwise rotation this automatically activates the plunger 45 to move towards the supply inlet 43 so that the resilient member 46 forms an airtight seal around the supply inlet 43, and also causes air to be pumped through the supply 44, and thus into the ring main 40.

Each cylinder 15 is controlled by a cylinder valve 47 to which air is supplied by duct 48 from the ring main. Air supply pipes 49 and 50 lead, respectively, to the opposite sides of the piston in the cylinder. The cylinder valve 47 is controlled by an actuator 51 which in turn is controlled by the individual timing mechanism for that reciprocating means. Depending upon the location of the actuator the air supply through pipes 49 and 50 either raises or lowers the piston, and thus the hanger 12 and the work piece on it.

The motor 10 is constructed so as to index the conveyor forward by ⅛ of a rotation at predetermined regular intervals and the actuator 51 then controls the movement of each individual hanger at predetermined times.

Each station is provided with its own timing mechanism so that the upward or downward movement of the hanger 12 at each station is independent of the movement at each of the other stations. Air jets or other means may be provided at one or more of the stations to cause the basket 13 to rotate around the bearing 14. At each movement of the conveyor one work piece may be unloaded at the unloading station 20 and a fresh work piece loaded.

There are eight treatment stations 19, the stations and the hangers 12 being uniformly spaced around the conveyor 8. The first treatment station 20 may serve for loading and unloading work pieces from the basket 13. In a penetrant inspection apparatus, the next treatment station 21 may be provided with conventional means for effecting degreasing. The next station, 22, may be provided with conventional means, such as sprays or an immersion tank, for applying fluoroescent dye penetrant. The next station 23 may be provided with sprays 24 for applying a pre-rinse. At the next station, 25, excess penetrant is removed and at the following station 26 the work pieces may be given a post-rinse by sprays 27.

Treatment station 28 may take the form of a drying oven and treatment station 29 may be provided with a spray 30 for applying dry powder developer.

The penetrant may be included in a penetrant pressure pot 31 and the dry powder developer in a suitable container 32 which conveniently are both located in the base of the treatment station 20. Appropriate water supplies 33 are provided for the sprays 24 and 27. Drains 34, 35, 36 and 37 may lead respectively from the degreasing, penetrant, pre-rinse and post-rinse stages to a main drain 38 from the penetrant remover stage. Alternatively the drains from the rinse stages 23 and 26 may lead to a separate drainage system at which water is filtered, while the drains from the other stations may be run off to a sump.

In a typical eight-stage treatment process as described above operating with a 6.5 minute rotation period the treatments may be as follows:

| Stage | | Time of Stage | Total Time |
|---|---|---|---|
| 1. | Load/Off-Load | | |
| 2. | Vapour degrease | 2.0 | |
|    | Cool | 4.5 | 6.5 |
| 3. | Penetrant application | 0.5 | |
|    | Contact | 6.0 | 13.0 |
| 4. | Contact | 4.5 | |
|    | Pre-rinse | 2.0 | 19.5 |
| 5. | Dwell | 5.0 | |
|    | Remover | 1.5 | 26.0 |
| 6. | Post-rinse | 2.0 | |
|    | Blow off spin (jigged) and dry | 4.5 | 32.5 |
| 7. | Oven dry | 6.5 | 39.0 |
| 8. | Dry powder developer | 0.5 | |
|    | Contact | 6.0 | 45.5 |

I claim:

1. Apparatus for treating a plurality of work pieces comprising a plurality of spaced apart treatment stations arranged around a circle, an outer housing, a conveyor and a plurality of spaced apart hangers each for holding a work piece, and a drive for moving the conveyor stepwise to move the hangers over the treatment stations, and in which the conveyor is a horizontal ring and there are a plurality of supports by which the ring conveyor is supported from the outer housing for rotation about its vertical axis, and each of the hangers is mounted on the ring and includes reciprocating means by which a work piece may be lowered into or raised from a treatment station.

2. Apparatus according to claim 1 that includes an outer housing having side walls and in which there are at least three said supports extending radially inwards from the side walls of the outer housing for supporting the horizontal ring about its vertical axis.

3. Apparatus according to claim 1 in which the drive for rotating the conveyor stepwise is a pneumatic or hydraulic drive and the reciprocating means are operated by pneumatic or hydraulic pressure.

4. Apparatus according to claim 1 in which the drive for rotating the conveyor is an electrical drive and the reciprocating means are electrically driven and there is a common power supply for the drive for rotating the conveyor and the reciprocating means.

5. Apparatus according to claim 1 which further includes means for rotating work pieces on at least one of the hangers.

6. Apparatus according to claim 1 which further includes a main timing mechanism for controlling the stepwise rotation of the conveyor and separate timing mechanisms for timing the operation of each individual reciprocating means.

7. Apparatus according to claim 1 in which at least one of the said treatment stations comprises an immersion tank or spray booth and at least one of the said treatment stations comprises means for heating or for blowing air.

8. Apparatus for treating a plurality of work pieces comprising a plurality of spaced apart treatment stations arranged around a circle, a conveyor and a plurality of spaced apart hangers each for holding a work piece, and a pneumatic or hydraulic drive for moving the conveyor stepwise to move the hangers over the treatment stations, and in which the conveyor is a horizontal ring and there are a plurality of supports by which the ring conveyor is supported for rotation about its vertical axis and each of the hangers is mounted on the ring and includes reciprocating means, operated by pneumatic or hydraulic pressure, by which a work piece may be lowered into or raised from a treatment station, and in which there is a ring main for supplying pneumatic or hydraulic pressure to the drive and to the reciprocating means and this ring main moves with the conveyor and all the reciprocating means are operably connected to it and the ring main is operably connected to its fluid or air supply only when the reciprocating means are located above treatment stations.

9. Apparatus according to claim 8 that includes an outer housing having side walls and in which there are at least three said supports extending radially inwards from the side walls of the outer housing for supporting the horizontal ring about its vertical axis.

* * * * *